United States Patent
Wang et al.

(10) Patent No.: US 12,544,169 B2
(45) Date of Patent: Feb. 10, 2026

(54) SURGICAL INSTRUMENT

(71) Applicant: SHENZHEN JINGFENG MEDICAL TECHNOLOGY CO., LTD., Guangdong (CN)

(72) Inventors: Jianchen Wang, Guangdong (CN); Yuanqian Gao, Guangdong (CN); Guiyin Xu, Guangdong (CN); You Li, Guangdong (CN); Xuefeng Yao, Guangdong (CN)

(73) Assignee: SHENZHEN JINGFENG MEDICAL TECHNOLOGY CO., LTD., Shenzhen (CN)

( * ) Notice: Subject to any disclaimer, the term of this patent is extended or adjusted under 35 U.S.C. 154(b) by 842 days.

(21) Appl. No.: 17/605,773

(22) PCT Filed: Apr. 24, 2020

(86) PCT No.: PCT/CN2020/086605
§ 371 (c)(1),
(2) Date: Oct. 22, 2021

(87) PCT Pub. No.: WO2020/216317
PCT Pub. Date: Oct. 29, 2020

(65) Prior Publication Data
US 2022/0226060 A1    Jul. 21, 2022

(30) Foreign Application Priority Data
Apr. 25, 2019 (CN) .......................... 201910338326.8

(51) Int. Cl.
*A61B 34/00* (2016.01)
*A61B 17/00* (2006.01)
(Continued)

(52) U.S. Cl.
CPC ........ *A61B 34/71* (2016.02); *A61B 17/00234* (2013.01); *A61B 18/1445* (2013.01);
(Continued)

(58) Field of Classification Search
CPC ... A61B 34/71; A61B 34/37; A61B 17/00234; A61B 18/1445; A61B 2017/00314; A61B 2017/00323; A61B 2018/00589
See application file for complete search history.

(56) References Cited

U.S. PATENT DOCUMENTS

| | | | |
|---|---|---|---|
| 9,005,238 B2 | 4/2015 | DeSantis et al. | |
| 2005/0075538 A1* | 4/2005 | Banik | A61B 1/0052 600/152 |

(Continued)

FOREIGN PATENT DOCUMENTS

| | | |
|---|---|---|
| CN | 105286989 B | 8/2017 |
| EP | 2594211 A1 | 5/2013 |

(Continued)

OTHER PUBLICATIONS

The extended European search report of of European Applicant application No. 20794723.5 mailed on May 1, 2023.

(Continued)

*Primary Examiner* — Eun Hwa Kim
*Assistant Examiner* — Catherine Premraj
(74) *Attorney, Agent, or Firm* — ScienBiziP, P.C.

(57) ABSTRACT

The present application discloses a surgical instrument. The surgical instrument includes an end effector, a connecting assembly, and a tip driving unit. The connecting assembly includes a plurality of connecting units connected in sequence, and the end effector is connected to the connecting assembly. The tip driving unit includes a flexible rod and a driving wire, the driving wire extends out of the flexible rod and is connected to the end effector. The flexible rod extends (Continued)

through the connecting assembly, and at least one end of the flexible rod is a free end. Due to the flexible rod, friction of the driving wire in a moving state can be reduced, thereby a life of the driving wire can be prolonged, and an accurate movement of the driving wire can be maintained.

18 Claims, 5 Drawing Sheets

(51) Int. Cl.
    *A61B 18/14*     (2006.01)
    *A61B 18/00*     (2006.01)
    *A61B 34/37*     (2016.01)

(52) U.S. Cl.
    CPC ............... *A61B 2017/00314* (2013.01); *A61B 2017/00323* (2013.01); *A61B 2018/00589* (2013.01); *A61B 34/37* (2016.02)

(56) References Cited

U.S. PATENT DOCUMENTS

| | | | |
|---|---|---|---|
| 2006/0199999 A1 | 9/2006 | Ikeda et al. | |
| 2010/0069833 A1* | 3/2010 | Wenderow | A61B 17/00234 604/95.01 |
| 2011/0251613 A1* | 10/2011 | Guerra | A61B 17/295 606/52 |
| 2012/0065628 A1* | 3/2012 | Naito | A61B 1/00078 606/1 |
| 2013/0023915 A1 | 1/2013 | Mueller | |
| 2016/0166343 A1 | 6/2016 | Poon et al. | |
| 2019/0008537 A1 | 1/2019 | Kirstgen et al. | |

FOREIGN PATENT DOCUMENTS

| | | |
|---|---|---|
| EP | 3427903 A1 | 1/2019 |
| JP | 1994-114000 A | 4/1994 |
| JP | 2013-103137 A | 5/2013 |
| JP | 2015-128535 A | 7/2015 |
| JP | 2015-523902 A | 8/2015 |

OTHER PUBLICATIONS

Notice of Reasons for Refusal of Japanese Applicant application No. P2021-563322 mailed on Jan. 4, 2023.
The Objections of Indian application No. 202117054335 mailed on Dec. 22, 2023.
The first Office Action of Indian application No. 202117054335 mailed on May 10, 2022.

* cited by examiner

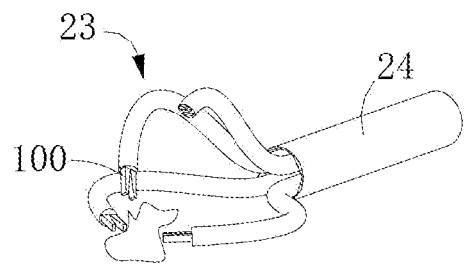
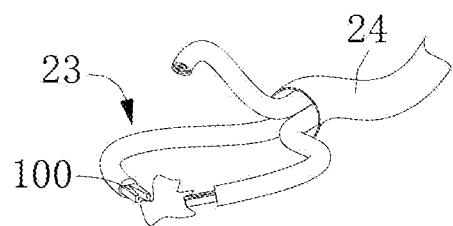
FIG. 2  FIG. 3
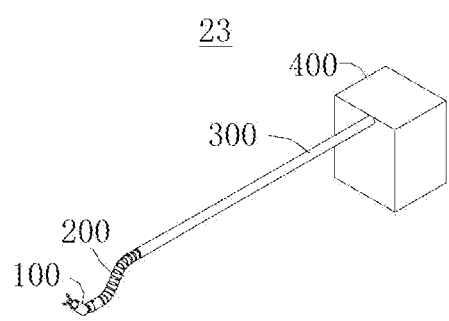
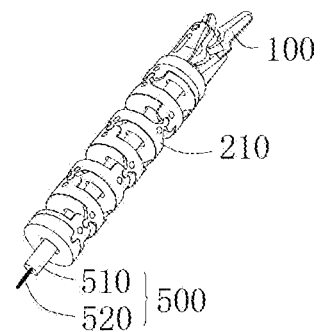
FIG. 4  FIG. 5

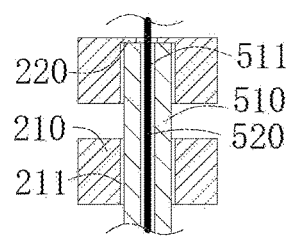
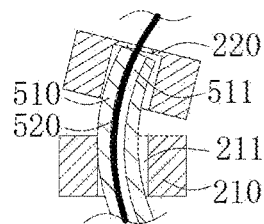
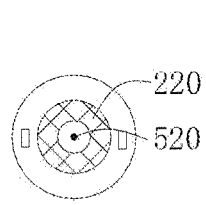
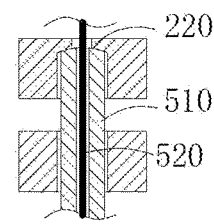
FIG. 6     FIG. 7     FIG. 8     FIG. 9
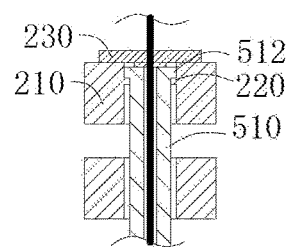
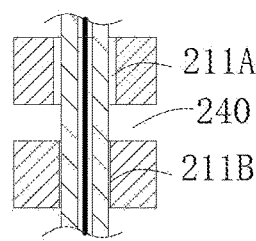
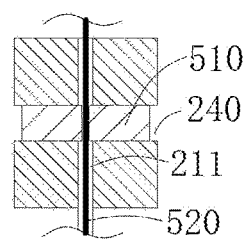
FIG. 10     FIG. 11     FIG. 12
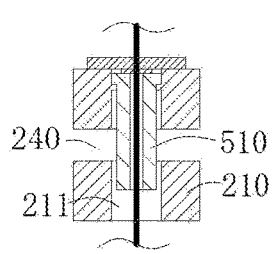
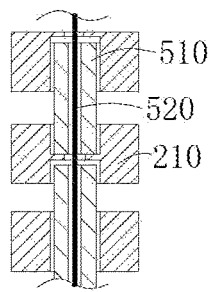
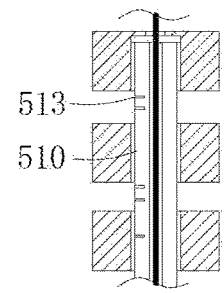
FIG. 13     FIG. 14     FIG. 15

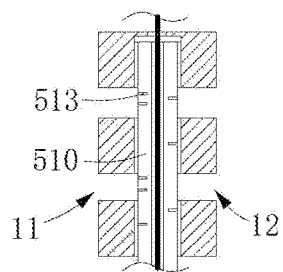
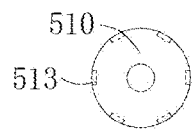
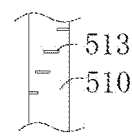
FIG. 16  FIG. 17  FIG. 18
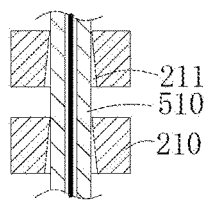
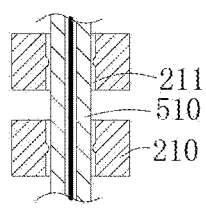
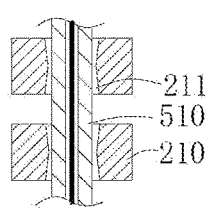
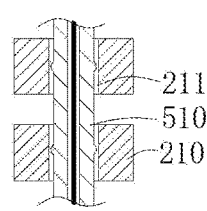
FIG. 19  FIG. 20  FIG. 21  FIG. 22
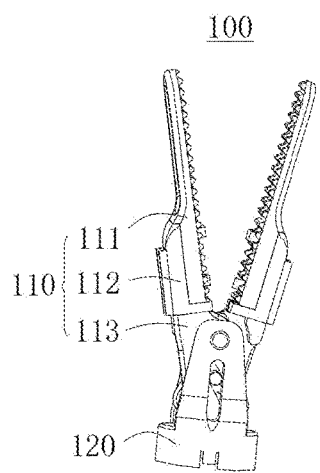
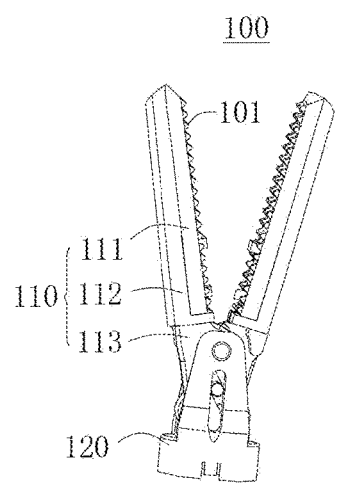
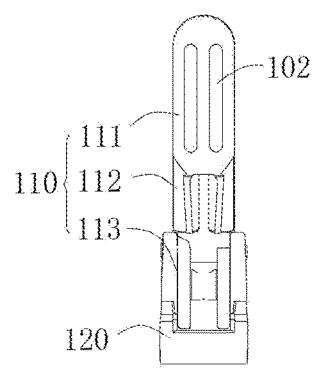
FIG. 23  FIG. 24  FIG. 25

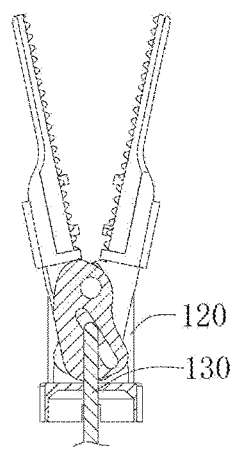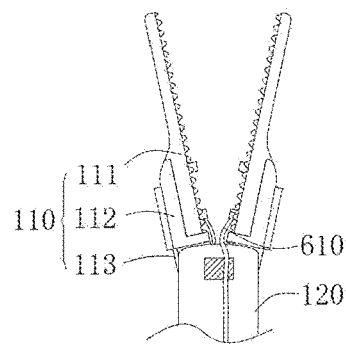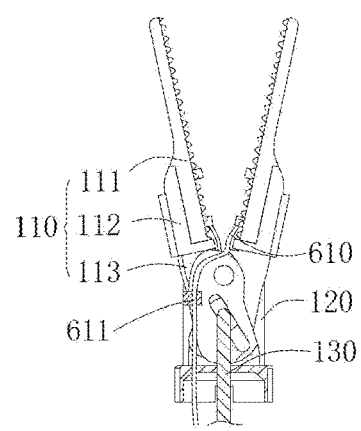
FIG. 26  FIG. 27  FIG. 28
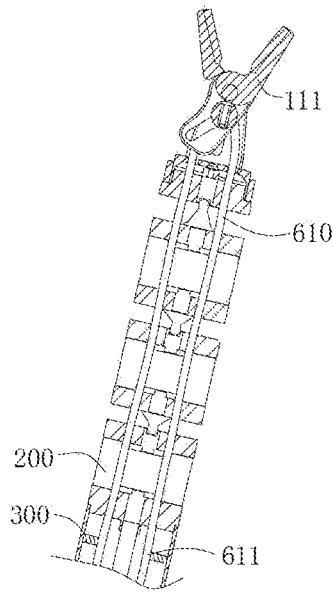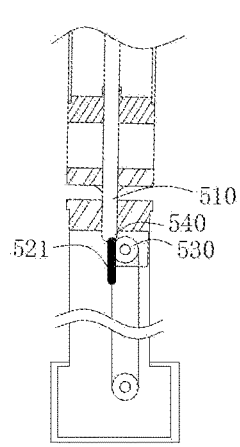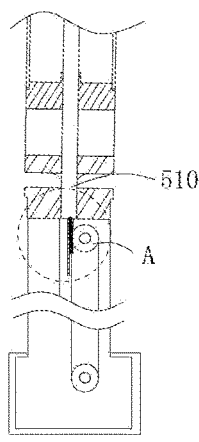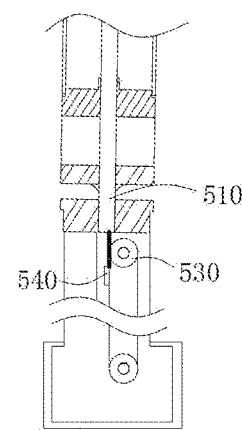
FIG. 29  FIG. 31  FIG. 32  FIG. 34
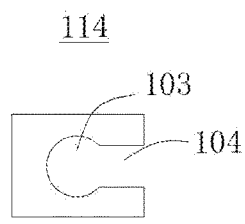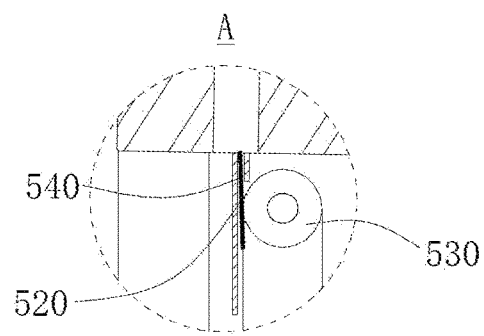
FIG. 30  FIG. 33

SURGICAL INSTRUMENT

The present disclosure claims a priority of a Chinese patent application NO. CN 201910338326.8 filed on Apr. 25, 2019 in China. All disclosures of the Chinese patent application may be quoted by the present disclosure.

FIELD

The subject matter herein generally relates to surgical systems, in particular to a surgical instrument.

BACKGROUND

Minimally invasive surgery refers to a surgical method of performing a procedure in a human body cavity using modern medical instruments such as laparoscopes, thoracoscopes, and so on. Compared with traditional surgery modes, minimally invasive surgery has advantages of being small in trauma, light in pain, fast in recovery, and the like.

With advances in science and technology, minimally invasive surgical technologies are increasingly mature and widely used. At present, surgical instruments usually have an adjusting member for adjusting positions and/or poses of the instruments, such that an end effector for the surgery can work in a desired position and/or poses. However, as the adjusting member is frequently moved for at least one freedom, a more accurate control for driving the adjusting member and as well as the end effector is needed.

SUMMARY

In view of the above problems, the present disclosure provides a surgical instrument with better driving performance.

In one embodiment, a surgical instrument includes: an end effector; a connecting assembly including a plurality of connecting units connected in sequence and connected to the end effector; and a tip driving unit including a flexible rod and a driving wire. The driving wire extends through the flexible rod and is connected to the end effector, the flexible rod extends in the connecting assembly, and at least one end of the flexible rod is a free end.

In another embodiment, a surgical instrument includes: an end effector; a connecting assembly including a plurality of connecting units connected in sequence and connected to the end effector; and a tip driving unit including a flexible rod and a driving wire, the driving wire extending through the flexible rod and connected to the end effector, the flexible rod extending in the connecting assembly, and at least one end of the flexible rod being a free end. A space is maintained between two adjacent connecting units to allow bending of the two adjacent connecting units, the flexible rod covers at least a part of the space; and the flexible rod includes a plurality of openings for facilitating bending of the flexible rod.

In further another embodiment, a surgical instrument includes: an end effector, a connecting assembly including a plurality of connecting units connected in sequence and connected to the end effector; and a tip driving unit including a flexible rod and a driving wire, the driving wire extending through the flexible rod and connected to the end effector, the flexible rod extending in the connecting assembly, and at least one end of the flexible rod being a free end. A space is maintained between two adjacent connecting units to allow bending of the two adjacent connecting units, the flexible rod covers at least part of the space; and the tip driving unit further includes a driving assembly and a positioning member, the driving wire includes a driving connecting portion, the driving connecting portion is connected to the driving assembly, at least at part of the driving wire extending out of the connecting assembly is oriented by the positioning member, and the driving wire is driven by the driving assembly along a straight line.

With the above embodiments of the surgical instruments, the driving wire extends through the flexible rod to be connected to the end effector, thus a friction of the driving wire in a driving state can be reduced, and thereby a life of the driving wire can be prolonged, and as well as an accurate movement of the driving wire can be maintained.

BRIEF DESCRIPTION OF THE DRAWINGS

FIG. 2 is a partial schematic view of an embodiment of a surgical robot.

FIG. 3 is a partial schematic view of another embodiment of a surgical robot.

FIG. 4 is a schematic view of an embodiment of a surgical instrument.

FIGS. 5-32 and FIG. 34 are partial schematic views of embodiments of the surgical instrument according to the present disclosure.

FIG. 33 is an enlarged view of the surgical instrument of FIG. 32.

DETAILED DESCRIPTION

For ease of understanding of the present application, the present application will be described more fully hereinafter with reference to the associated drawings. Preferred embodiments of the present application are set forth in the accompanying drawings. This application may, however, be embodied in many different forms and is not limited to the embodiments described herein. Rather, these embodiments are provided for the purpose of providing a more thorough and thorough understanding of the disclosure of the present application.

It should be noted that when an element is referred to as being "disposed on" another element, it may be directly on the other element or intervening elements may also be present. When an element is considered to be "connected" to another element, it may be directly connected to another element or intervening elements may be present at the same time. When an element is considered to be "coupled" to another element, it may be directly coupled to another element or intervening elements may be present at the same time. As used herein, the terms "vertical", "horizontal", "left", "right" and the like are intended for purposes of illustration only and are not intended to be limiting. As used herein, the terms "distal end" and "proximal end" are common terms in the art of interventional medical devices, where "distal end" refers to the end far away from the operator during the surgical procedure, and the "proximal end" refers to the end close to the operator during the surgical procedure.

Unless defined otherwise, all technical and scientific terms used herein have the same meaning as commonly understood by one of ordinary skill in the art. The terminology used herein is for the purpose of describing particular embodiments only and is not intended to be limiting of the invention. As used herein, the term "and/or" includes all combinations of one or more of the associated listed items.

Figure 1:
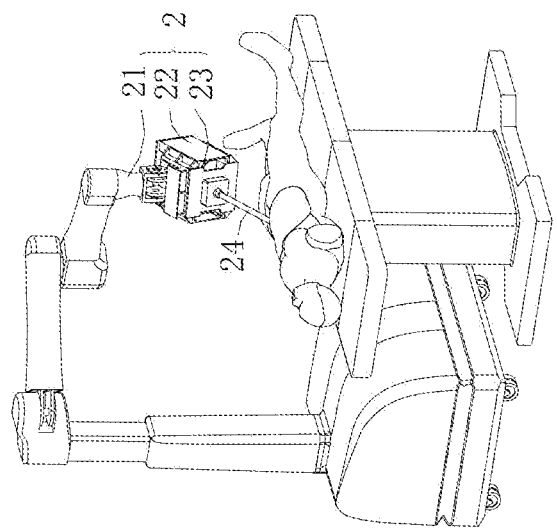
FIG. 1 is a structural schematic view of an embodiment of a surgical robot according to the present disclosure.
Figure 1:
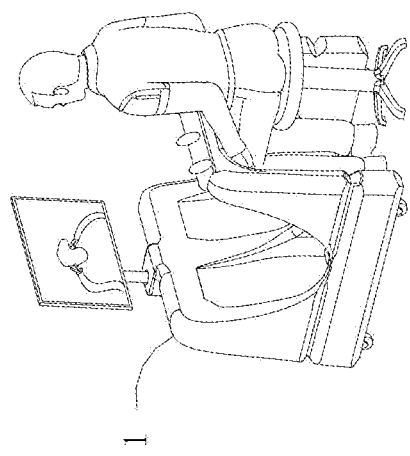

Referring to FIG. 1, a surgical robot in accordance with an embodiment of the present application includes a master console 1 and a slave operating device 2. The master console 1 is used for sending control commands to the slave operating device 2 according to the operation of a surgeon to control the slave operating device 2. The master console 1 is also used for displaying images acquired from the slave operating device 2. The slave operating device 2 is used for responding to the control commands sent by the master console 1 and performing corresponding operations, and the slave operating device 2 is also used for acquiring images in human body.

Specifically, the slave operating device 2 includes a mechanical arm 21, a power mechanism 22 disposed on the mechanical arm 21, a surgical instrument 23 disposed on the power mechanism 22, and a sleeve 24 sleeving the surgical instrument 23. The mechanical arm 21 is used for adjusting the position of the surgical instrument 23. The power mechanism 22 is used for driving the surgical instrument 23 to perform a corresponding surgical operation. The surgical instrument 23 is used for extending into the human body and performing a surgical operation by an end effector located at a tip end thereof, and/or acquiring images within the human body. In one embodiment, as shown in FIG. 2 and FIG. 3, the surgical instrument 23 is sleeved in the sleeve 24, and an end effector 100 extends out of the sleeve 24 and is driven by the power mechanism 22 to perform the surgical operation. In FIG. 2, the part of the surgical instrument 23 sleeved in the sleeve 24 is a rigid part. In FIG. 3, the part of the surgical instrument 23 sleeved in the sleeve 24 is a flexible part, and the sleeve 24 is bent with the flexible part. In another embodiment, the sleeve 24 may also be omitted.

Referring to FIGS. 4 and 5, the surgical instrument 23 includes the end effector 100, a connecting assembly 200, a connecting rod 300, a driving housing 400, and a tip driving unit 500. The end effector 100, the connecting assembly 200, the connecting rod 300, and the tip driving unit 500 are sequentially connected. The tip driving unit 500 is located in the driving housing 400, and is connected to the end effector 100, for driving the end effector 100 to perform a surgical operation, for example, when the end effector 100 is a clamping device, driving the end effector 100 to open or close. In other embodiments, the connecting rod 300 and/or the driving housing 400 can be omitted.

The connecting assembly 200 includes a number of connecting units 210 connected in sequence. In particular, the connecting units 210 can be connected directly, for example, the connecting unit 210 has a connecting shaft, and two adjacent connecting units 210 are connected by the connecting shaft. In other embodiments, the connecting units 210 can be connected by another element, for example, the connecting units 210 can be connected by a driving wire, and the driving wire can drive the connecting assembly 200 to move. In particular, a size and a structure of the connecting units 210 can be the same or different. In other embodiments, the connecting assembly 200 can be other structures.

The tip driving unit 500 includes a flexible rod 510 and a driving wire 520 received in and extending out of the flexible rod 510, the driving wire 520 is connected to the end effector 100, and is configured for driving the end effector 100, and the flexible rod 510 can orient the movement of the driving wire 520. In particular, a rigidity of the driving wire 520 is greater than that of the flexible rod 510, but the driving wire 520 can be flexible with the connecting assembly 200, and can drive the end effector 100 to open or close. For example, a rigidity of the driving wire 520 can be 50-70 N/mm. When the driving wire 520 drives the end effector 100 to move towards a distal end from a proximal end, the flexible rod 510 can obstruct the driving wire being bent, such that the end effector 100 can move more accurately. A friction coefficient between the driving wire 520 and the flexible rod 510 is less than that of between the driving wire 520 and the connecting assembly 200, in this way, the flexible rod 510 can decrease the friction of the driving wire 520 in a movement state contrast to that the driving wire 520 being directly received in the connecting assembly, a life of the driving wire 520 can be prolonged, and thus the accuracy of its movement can be maintained.

In one embodiment, the flexible rod 510 is oriented to extend along a central axis of the connecting assembly 200. That is, the flexible rod is disposed at a center area of the connecting assembly and extends along the connecting assembly 200. In particular, the flexible rod 510 maintains a space from the connecting assembly 200, thereby the flexible rod 510 has a little freedom relative to the connecting assembly 200, and thus a friction between the flexible rod 510 and the connecting assembly 200 can be reduced. For example, the space can be 0.1-3 mm, or can be 0.2 mm. In another embodiment, the flexible rod 510 is not in a central area of the connecting assembly 200, but at a periphery of the connecting assembly, and extends along with the connecting assembly. In other embodiments, the connecting units 210 can have a number of receiving holes, and the flexible rod 510 can be received in one of the receiving holes according to need.

Referring to FIG. 6, the flexible rod 510 defines a wire hole 511, the driving wire 520 is received in the wire hole 511. In one embodiment, the wire hole 511 is defined at a central area of the flexible rod 510, and extends along with the flexible rod 510. In another embodiment, the wire hole 511 can be defined at other areas, for example, the wire hole 511 is near a central axis of the flexible rod 510, and extends along with the flexible rod 510, i.e., the driving wire 520 deviates a little from the central area of the flexible rod 510. In further another embodiment, a number of the wire holes 511 are defined, and each one of the wire holes 511 maintains a space from the other ones, and the driving wire 520 can be received in one of the wire holes 511. In particular, a space is maintained between the driving wire 520 and an inner wall of the wire hole 511, for example, the space can be 0.05-0.5 mm, or can be 0.2 mm.

In one embodiment, the flexible rod 510 extends along the connecting assembly 200, and at least one end of the flexible rod 510 is a free end, with a direction of which can be changed by a force applied thereon. In this way, a deformation of the flexible rod 510 can be reduced, and thus the position of the driving wire 520 in the flexible rod 510 can be more accurate and the movement of the end effector 100 can also be accurate. As shown in FIGS. 6 and 7, a free end of the flexible rod 510 is an end of the flexible rod 510 which is not fixed, and a retaining portion 220 is formed on the connecting assembly 200 to retain the free end of the flexible rod 510. In one embodiment, the free end of the flexible rod 510 is located on an end of the flexible rod 510 by a universal structure, thereby a direction of the free end of the flexible rod 510 can be changed when a force is applied thereon, and a stretching deformation of the flexible rod 510 can be reduced. In other embodiments, the free end of the flexible rod 510 can be retained by other structures facilitating reducing a deformation of the flexible rod 510. In another other embodiments, an end of the flexible rod 510 can be fixed, that is the flexible rod 510 does not have a free end.

When the flexible rod 510 includes more than one ends, the flexible rod 510 can have one free end, or can have two free ends (see FIGS. 1 and 19-22). When the flexible rod 510 has only one free end, the other end of the flexible rod 510 is fixed, for example, a distal end of the flexible rod 510 is a free end, a proximal end of the flexible rod 510 is fixed to the connecting assembly 200, the connecting rod 300, and the driving housing 400 removably or unremovably. When the flexible rod 510 has two free ends, the two free ends are retained by some structures, for example, the two free ends are retained by the retaining portions 220. In other embodiments, one of the two free ends is retained by the retaining portion 220, and the other one of the two free ends is retained by a universal structure. In further other embodiments, the flexible rod 510 has two free ends.

Referring to FIGS. 6 and 7, the free end of the flexible rod 510 is retained by the retaining portion 220, the connecting unit 210 has a receiving hole 211, and the flexible rod 510 is received in the receiving hole 211. In particular, at least one of the connecting units 210 has the retaining portion 220, and the retaining portion 220 covers a part of the receiving hole 211, thus retains the free end of the flexible rod 510, thereby limiting the movement of the free end of the flexible rod 510. In the present embodiment, the retaining portion 220 only covers a part of the receiving hole 211, and the driving wire 520 can extend out of the receiving hole 211 to be connected to the end effector 100. The retaining portion 220 and the receiving hole 211 form a receiving space for receiving the free end of the flexible rod 510. In particular, when the connecting assembly 200 has two connecting units 210 with each of which has a retaining portion 220, and the retaining portions 220 and the connecting units 210 therebetween forms a receiving space for receiving the flexible rod 510. A size and a structure of the above receiving hole 211 can be the same or can be different.

The retaining portion 220 can have different structures. For example, as shown in FIGS. 6 and 7, the retaining portion 220 is a continuous piece, and gives only a passage for the driving wire 520 passing through. In other embodiments, as shown in FIG. 8, the retaining portion 220 is porous, and thus has a plurality of holes, the driving wire 520 extends through one of the holes of the porous retaining portion 220. As shown in FIG. 9, the retaining portion 220 has a curved surface, and correspondingly the flexible rod 510 also has a curved surface. The retaining portion 220 can be integrally formed with the connecting units 210, or can be detachably connected to the connecting units 210.

A fixed end of the flexible rod 510 can have different structures, as shown in FIG. 10, the fixed end of the flexible rod 510 has a flange 512, and the flange 512 is configured for engaging with the connecting assembly 200. In particular, the connecting unit 210 has the retaining portion 220, the flange 512 is engaged with the retaining portion 220, and the connecting unit 210 has a cover 230 in a configuration that the flange 512 is received between the retaining portion 220 and the cover 230, thereby the end of the flexible rod 510 is fixed. In other embodiments, the retaining portion 220 can be omitted, in this situation, the flange 512 is engaged with an end of the connecting unit 210. In further other embodiments, the cover 230 can also be omitted, and the flange 512 is engaged with an adjacent structure of the connecting unit. In another embodiment, the flexible rod 510 can be fixed by other methods, such as being stuck.

In one embodiment, the flexible rod 510 can be retained at a middle portion thereof, thereby orienting the flexible rod 510 and the driving wire 520. As shown in FIG. 11, the receiving hole 211 has a first receiving hole 211A and a second receiving hole 211B, a diameter of the second receiving hole 211B is less than that of the first receiving hole 211A, such that a space between the flexible rod 510 and an inner wall of the first receiving hole 211A is greater than a space between the flexible rod 510 and an inner wall of the second receiving hole 211B. In particular, the flexible rod 510 can move in the second receiving hole 211B, that is, the space therebetween can allow the flexible rod 510 to move therein. In other embodiments, the flexible rod 510 can be almost fixed in the second receiving hole 211B, that is, the space therebetween is very little, alternatively, the flexible rod 511 is fixed relative to the connecting assembly 200. When the flexible rod is almost fixed in the second receiving hole 211B, the connecting unit 210 having the second receiving hole 211B can be a detachable structure, such that facilitating assembly of the flexible rod 510 into the second receiving hole 211B. The second receiving hole 211B can reduce the movement of the flexible rod 510, thereby a control of the end effector can be more accurate.

When the connecting assembly 200 have a number of the second receiving holes 211B, the plurality of the second receiving holes 211B are spaced, i.e., in two adjacent connecting units 210, only one of the connecting units 210 has the second receiving hole 211B, in this way, deformation of the flexible rod in a bending state can be reduced. The second receiving holes 211B can surround a central area of the flexible rod 510, or surround a proximal end or distal end of the flexible rod 510.

In particular, sections of the flexible rod 510 can have different size, such that different sections of the flexible rod 510 can have different spaces with the second receiving holes 211B, thereby retaining the flexible rod 510 in the second receiving holes 211B. Alternatively, adjusting both of the size of the flexible rod 510 and the second receiving hole 211B, i.e., adjusting an outer diameter of the flexible rod 510 and an inner diameter of the second receiving hole 211B, thereby a space therebetween can be adjusted. In other embodiments, the connecting assembly 200 does not obstruct the movement of the central area of the flexible rod 510, and the connecting units 210 can be bent with the free end of the flexible rod 510, thereby reducing the deformation of the flexible rod 510 when the flexible rod 510 is in a bending state.

In embodiments shown as in FIGS. 4-16, two adjacent connecting units 210 of the connecting assembly 200 has a space 240, in this way, the connecting units 210 can move towards each other. The flexible rod 510 covers at least a part of the space 240, in this way, the flexible rod 510 can obstruct bending of the driving wire 520 in the space 240, thereby reducing bending of the driving wire 520, and thus the movement of the driving wire 520 can be more accurate.

The flexible rod 510 can cover the entire space 240 of the connecting assembly, alternatively, cover a part of the space 240 of the connecting assembly 200. When the space 240 of the connecting units 210 is partially covered, each space 240 between each of adjacent connecting units 210 is partially covered, and the covered portions of the space 240 are equally spaced. Preferably, when the movement between the two adjacent connecting units 210 is greater than others, then most of the space 240 or the entire of the space 240 is covered by the flexible rod 510, thereby bending of the driving wire 520 can be reduced. In one embodiment, the covered portion of the space 240 and the uncovered portion of the space 240 are equally spaced. In detail, two adjacent covered spaces 240 can have one or more uncovered space 240 therebetween. In addition, the connecting units 210 can have different structures, for example, two adjacent connecting units 210 may not have the space 240.

The above covered portion of the space 240 can be entirely covered, or can be partially covered by the flexible rod 510. When the space 240 is partially covered by the flexible rod 510, the bending of the driving wire 520 can be obstructed. In one embodiment, an uncovered portion of the space 240 has 1-4 mm in height.

Referring to FIG. 12, the flexible rod 510 is located in the space 240, but is not received in the receiving hole 211, to obstruct the driving wire 520 being bent at the space 240. In this situation, an inner diameter of the receiving hole 211 can be a little greater than an outer dimeter of the driving wire 520, to obstruct the driving wire 520 being bent. In other embodiments, an inner diameter of the receiving hole 211 can give a greater space for the movement of the driving wire 520, thereby reducing the friction therebetween. In this situation, more than one of the flexible rods 510 can be positioned at the corresponding connecting units 210 to cover the corresponding space 240.

The flexible rod 510 can extend part of the connecting units 210. As shown in FIG. 13, at least one end of the flexible rod 510 is received in the connecting units 210, that is, an end of the flexible rod 510 is not in the space 240. For example, two ends of the flexible rod 510 can be received in the receiving hole 211 of the connecting units 210. In other embodiments, the flexible rod 510 is received in all of the connecting units 210, for example, the flexible rod 510 extends out of three adjacent connecting units 210, alternatively, the flexible rod 510 extends out of one connecting unit 210, and is partially received in another connecting unit 210. In other embodiments, an end of the flexible rod 510 can be received in the space 240, for example, a free end of the flexible rod 510 can be received in the space 240.

Referring to FIG. 14, there are more than one, or a plurality of the flexible rods 510 arranged along an extending axis of the connecting assembly 200, and the driving wire 520 extends out the flexible rods 510. In particular, the flexible rods 510 are spaced with each other, that is, ends of the flexible rods 510 do not contact with each other, and when the connecting units 210 rotate, the ends of the flexible rods 510 do not interfere with each other. When the connecting units 210 are in a bending state, the more than one, or the plurality of the flexible rods 510 can reduce deformation thereof, thereby making the control of the driving wire 520 more accurate.

In the present embodiments, two adjacent ends of the flexible rods 510 are received in the connecting units 210. In other embodiments, ends of the flexible rods 510 can be received in the space 240, in a same space 240 or in different spaces 240.

In one embodiment, lengths of the flexible rods 510 are the same. In other embodiments, at least two flexible rods 510 have different lengths, or all of the flexible rods 510 have different lengths. In further other embodiments, the flexible rod 510 in frequently bent connecting units 210 can have a shorter length, and in rarely bent connecting units 210 can have a longer length. Alternatively, a length of a flexible rod 510 at a distal end is less than that of the flexible rod 510 at a proximal end.

In one embodiment, a space between the flexible rod 510 and the receiving hole 211 can be predetermined according to need. For example, at least two flexible rods 510 have different spaces with the receiving hole 211. Alternatively, all the flexible rods 510 have the same space with the receiving hole 211, but different sections of the flexible rods 510 can have different spaces with the receiving hole 211.

In one embodiment, a cross section of each of the flexible rods 510 is the same, in this situation, the flexible rods 510 can be in a columnar shape, and different sections of the flexible rods 510 are the same. In detail, the specs including shapes and sizes, and the cross section of the flexible rods 510 can be in a round, ellipse, triangle, or polygon shape. In other embodiments, at least two flexible rods 510 have different cross section sizes, such that a space between a distal end of the flexible rod 510 and an inner wall of the receiving hole 211 is greater than a space between a proximal end of the flexible rod 510 and the inner wall of the receiving hole 211. Alternatively, a size of the flexible rod 510 in frequently bent connecting units 210 is less than a size of the flexible rod 510 in rarely bent connecting units 210, such that the space between the frequently bent flexible rod 510 and the inner wall of the receiving hole 211 can be greater than the space between the rarely bent flexible rod 510 and the inner wall of the receiving hole 211. Alternatively, sections of the flexible rod 510 have two different sizes, and the sections of different sizes are spaced arranged.

Alternatively, cross sections of a same flexible rod 510 can have different sizes, for example, a cross section size of a proximal end of the flexible rod 510 is less than a cross section size of a distal end of the flexible rod 510. Alternatively, cross sections of the flexible rod 510 can have different shapes.

When the specs of the cross sections of the flexible rod 510 are different, the space between the flexible rod 510 and the inner wall of the receiving hole 211 are different, the greater space, the more flexible of the flexible rod 510 with the connecting units 210 when in a bending state; and the less space, the less movement of the flexible rod 510 in the receiving hole 211, resulting that a position of the driving wire 520 can be better controlled.

The rigidity of the flexible rods 510 can be selected according to need, for example, the rigidity of the flexible rods 510 can be the same, alternatively, at least two flexible rods 510 have different rigidity. Alternatively, the rigidity of frequently bent sections of the flexible rod 510 is less than that of rarely bent sections of the flexible rod 510.

In other embodiments, the flexible rods 510 are received in the connecting units 210, uncover the space 240, or partially cover the space 240. The arrangement, structures, and connection with other elements can be combined with the embodiments illustrated above.

In one embodiment, the flexible rod 510 has one or more openings 513, with this configuration, the flexible rod 510 can be bent more easily, and thereby the deformation of the flexible rod 510 in a bending state can be reduced. The openings 513 can have different arrangements. As shown in FIG. 15, there are a plurality of the openings 513, and the openings 513 are arranged at a same side of the flexible rod 510. As shown in FIG. 16, the plurality of the openings 513 are arranged at two opposite sides of the flexible rod 510. In the present embodiment, the openings 513 in a first side 11 are spaced with the openings 513 in a second side 12, each of the openings 513 in the first side 11 is arranged between two openings 513 in the second side 12, and each of the openings 513 in the first side 11 can be adjacent to, or not adjacent to one of the openings 513 in the second side 12. For example, three openings 513 in the first side 11 are arranged between two openings 513 in the second side 12, and the three openings 513 in the first side 11 are arranged in sequence. In other embodiments, the openings 513 in the first side 11 and the second side 12 can be arranged in a regular pattern, or in an irregular pattern. As shown in FIG. 17, the flexible rod 510 has a plurality of the openings 513, and the plurality of the openings 513 are arranged in a periphery of the flexible rod 510 along an extending axis thereof. As shown in FIG. 18, the plurality of the openings 513 are in a step shape and arranged along an extending axis of the flexible rod 510.

In particular, the openings 513 can be located in the space between the connecting assembly 200, alternatively, can be received in the connecting units of the connecting assembly 200, and in some embodiments, some openings 513 are located in the space between the connecting units 210, and other openings 513 are received in the connecting units 210.

The openings 513 can be in different shapes, for example, the openings 513 are in a strip shape. Alternatively, the openings 513 are in a line shape, that is the opening 513 are cut in the flexible rod 510, or in a wave shape.

Referring FIGS. 19 to 22, an inner wall of the receiving hole 211 and/or the flexible rod 510 has an abutting portion, thereby the flexible rod 510 and the receiving hole 211 can be abutted at each other. That is, when the flexible rod 510 and the connecting units 210 extend along an axis, and the flexible rod 510 is located in the connecting units 210 at a side thereof, the flexible rod 510 and the receiving hole 211 can be abutted at each other at the abutting portion, without the entire side of the connecting units 210 abutting the flexible rod 510. In this way, a contact area between the flexible rod 510 and the connecting units 210 can be reduced, thus the friction therebetween can be reduced.

The abutting portion can have different structures, for example, the abutting portion can be a curved surface, or a flat surface and so on. As shown in FIG. 19, the receiving hole 211 is in a cone shape, and the abutting portion can be the smaller end of the cone-shaped receiving hole 211. In particular, the connecting units 210 having a cone-shaped hole can also retain the free end of the flexible rod 510, that is, when an opening thereof is smaller, the flexible rod 510 cannot extend out of, a position of the free end of the flexible rod 510 can be determined. As shown in FIG. 20, an inner wall of the receiving hole 211 has a protrusion, the abutting portion can be located on the protrusion. In detail, the abutting portion can be one or more, more than one abutting portions can be arranged along a periphery of the connecting units 210, i.e., along a periphery of an inner wall of the receiving hole 211. As shown in FIG. 21, the receiving hole 211 is in a sandglass shape, a protrusion in an inner wall thereof is the abutting portion. In more detail, the receiving hole 211 are two communicated cone-shaped holes, the protrusion is defined between the two communicated cone-shaped holes, the cone-shaped holes can have the same specs, or different specs, i.e., the protrusion can be at a middle portion of the connecting unit 210, or at an end portion thereof. As shown in FIG. 22, the abutting portion is defined on the flexible rod 510, in detail, the flexible rod 510 has the protrusion to abut at an inner wall of the receiving hole 211.

In one embodiment, the abutting portions of the connecting units 210 are the same. In other embodiments, at least two connecting units 210 has different abutting portions.

Referring to FIG. 23, the end effector 100 has two rotatable clamping portions 110. In particular, the clamping portions 110 has two clamps 111, an insulating member 112, two rotatable members 113, the clamp 111 forms electrodes, and is insulated with the rotatable member 113 by the insulating member 112, the rotatable members 113 are rotatably connected to allow the clamps 111 to open or close. The insulating member 112 makes the clamps 111, the rotatable members 113, and the connecting assembly 200 being insulated with each other, thus improving the stabilization of the end effector 100. In the present embodiments, the clamps 111 and the rotatable members 113 are made by metallic materials, for ensuring a rigidity thereof. In other embodiments, the rotatable members 113 can be made by insulated materials, in this situation, the rotatable members 113 can be connected to the clamps 111 by the insulating member 112, or alternatively, the insulating member 112 can be omitted.

In particular, the end effector 100 can have other structures, for example, the insulating member 112 is positioned between the two rotatable members 113, to make the rotatable members 113 being insulated with each other. Alternatively, the clamps 111 are rotatably connected to the rotatable members 113, the insulating member 112 is on a main body and also makes the clamps 111 being insulated with the rotatable members 113, meanwhile makes the rotatable members 113 being insulated with each other. In this situation, the rotatable members 113 are positioned on the main body, and can be rotatable relative to the main body, the connecting units 210 are also connected to the main body. In other embodiments, the clamping portions 110 can work without the insulating member 112.

Referring again to FIG. 23, the insulating member 112 protrudes outwards from the clamps 111. Referring to FIG. 24, the insulating member 112 does not protrude outwards from the clamps 111, but the clamps 111 are positioned in the insulating member 112, and each of the clamps 111 has a clamping surface 101. The clamping surfaces 101 face each other. In this situation, the clamping surfaces 101 protrude from the insulating member 112. In embodiments, the clamping surfaces 101 of the clamps 11*l* can be flat with the insulating member 112 or positioned in the insulating member 112. For example, one clamping surface 101 protrudes from the insulating member 112, and the other clamping surface 101 is positioned in the insulating member 112. Alternatively, the clamping surfaces 101 are flat with the insulating member 112. In a situation of the clamping surface 101 being positioned in the insulating member 112, the insulating member 112 does not influence the electrode work when the clamps 111 are in a state of clamping a muscle tissue.

In one embodiment, one of the clamps 111 has an electrode. As shown in FIG. 25, each of the clamps 111 has more than one electrode 102, and the electrodes 102 face each other for facilitating forming a conductive loop when the clamps 111 are in the state of clamping muscle tissue. In the present embodiment, the clamp 111 has a conductive strip, the conductive strip acts as an electrode, when the clamp 111 has only one electrode, the conductive strip can be only one. Alternatively, the entire clamp 111 can be an electrode.

Referring to FIGS. 23 and 24, the insulating member 112 at least covers two surfaces of the clamps 111 and/or the rotatable members 113, to be securely connected to the clamps 111 and/or the rotatable members 113. Alternatively, the insulating member 112 can be connected to the clamps 111 and/or the rotatable members 113 by other structures, such as by a connecting assembly; alternatively, the insulating member 112 is integrally formed with the clamps 111 and/or the rotatable members 113; and alternatively, the insulating member 112 can be riveted to the clamps 111 and/or the rotatable members 113. In other embodiments, the insulating member 112 can be connected to only one surface of the clamps 111 and/or the rotatable members 113.

Referring to FIGS. 23 to 26, the end effector 100 further includes a body 120, the rotatable members 113 are positioned on the body 120, and are rotatable relative to the body 120 surrounding a rotation axis, and the rotation axis is not changed when the rotatable members 113 are rotated. In the present embodiment, the end effector 100 further includes push rods 130 connected to the respective rotatable members 113, the push rods 130 and the rotatable members 113 form a four-bar structure, thereby driving the clamps 111 to open or close. In detail, the driving wire 520 of the tip driving unit 500 is connected to the push rods 130, thereby driving the clamps 111 by the push rods 130.

In other embodiments, the clamping portion 110 can be driven by other structures, alternatively, the push rods 130 can be omitted. In this situation, the driving wire 520 of the tip driving unit 500 can be directly connected to the rotatable members 113, thereby driving the rotatable members 113 to rotate.

Referring to FIGS. 27 to 29, the surgical instrument 23 further includes an electrocoagulation assembly. In detail, the electrocoagulation assembly includes a conductive wire 610, a distal end of the conductive wire 610 is connected to the clamps 111, thereby the clamps III forms an electrode. Part of the conductive wire 610 in the connecting assembly 200 is in a loose state, and the conductive wire 610 has a fixing portion 611 fixed to a body and/or the end effector 100, thereby the distal end of the conductive wire 610 can be disposed adjacent to the end effector 100. In detail, the body includes one of connecting assembly, connecting rod, driving housing, for example, the body may include the connecting assembly and the connecting rod, alternatively, the body may include the connecting assembly and the driving housing. When the fixing portion 611 of the conductive wire 610 is in the connecting unit, at least part of the conductive wire 610 in the connecting assembly is in a loose state. The loose state of the conductive wire 610 is when the connecting units are in an extend state, a length of the conductive wire 610 in the connecting assembly is greater than a length of the connecting assembly; or alternatively, when the conductive assembly is in a bending state, at least part of the conductive wire 610 has the length greater than that of the part when the connecting assembly is in an extend state, in a condition that a tension of the conductive wire 610 remains unchanged. In one embodiment, the length of the conductive wire 610 in the connecting rod, is greater than a length of the connecting rod, in this way, when the connecting assembly is in a bending state, the conductive wire 610 in the connecting rod is disposed in the connecting assembly, to meet the bending of the connecting rod. Alternatively, the conductive wire 610 can be collected in a collecting portion, when the connecting assembly is in a bent state, the conductive wire 610 is released to make the conductive wire 610 in the connecting unit longer. In particular, the end effector 100 can also be hook electrode, which is connected to the conductive wire 610 to activate the electrode.

As the above-mentioned connecting units are in a loose state, when the connecting assembly is bent, the conductive wire 610 is not in a tightening state, thereby an accurate operation of the surgical instrument 23 can be achieved, thus extending a life of the conductive wire 610. The above-mentioned fixing portion 611 can limit the conductive wire 610 at the end effector 100 to be too loose.

The fixing portion 611 can be designed according to need. As shown in FIG. 28, the fixing portion 611 is defined at an area adjacent to the rotatable members 113, and the area can be on the rotatable members 113, the main body 120, a rotation shaft and so on areas. In the present embodiment, the fixing portion 611 is defined on the main body 120 adjacent to the rotation shaft, in this way, when the clamping portions 110 open or close, a first distance defined between the fixing portion 611 of the main body 120 and a distal end of the clamps 111 remains unchanged. Furthermore, in the present embodiment, a second defined between the fixing portion 611 and a distal end of the conductive wire 610 is almost equal to the above-mentioned first distance, in this way, the conductive wire 610 is adapted to the clamping portion 110, thus avoid the conductive wire 610 to be too loose to influence the work of the end effector 100. In this situation, as the first distance remains unchanged, the conductive wire 610 will not be dragged.

In other embodiments, the fixing portion 611 of the conductive wire 610 can be defined on the rotatable members 113, for example, on a rotation axis area of the rotatable members 113, or alternatively, the fixing portion 611 can be defined on a rotation shaft of the rotatable members 113. As shown in FIG. 28, the fixing portion 611 is not at the rotation axis area of the rotatable members 113, as well as not at the rotation shaft of the rotatable members 113, in this situation, the above-mentioned second distance is greater than the first distance, thereby the clamping portion 110 has space to open or close, and at the same time the conductive wire 610 is avoided to be too tight.

In other embodiments, the above-mentioned second distance can be a little greater than the first distance, for example, the second distance can be 1-3 mm greater than the first distance. In this situation, the conductive wire 610 extends along the clamping portion 110, and is in a loose state.

The fixing portion 611 can also be defined on a main body of the surgical instrument 23. In one embodiment, the fixing portion 611 is defined at a proximal end of the main body, and is nearer than a proximal end of the connecting assembly 200. As shown in FIG. 29, the fixing portion 611 is defined at the connecting rod 300, or alternatively, the fixing portion 611 can be defined on the driving housing 400. In one embodiment, the fixing portion 611 is defined on a connecting unit 210 at a proximal end of the connecting assembly 200. In these ways, the conductive wire 610 is not too tight when the connecting assembly 200 are in a bending state, as well as not too loose to be free.

In one embodiment, the fixing portion 611 can be defined in the connecting assembly 200, and the fixing portion 611 divides the conductive wire 610 in the connecting assembly 200 into at least two sections, in more detail, at least one section is in a loose state, or alternatively, all sections are in loose state. The fixing portion 611 defined in the connecting assembly 200 can reduce the movement of the conductive wire 610 in the connecting assembly 200.

The fixing portion 611 of the conductive wire 610 can be one or more, and the more than one fixing portions 611 can be arranged on any of the above-mentioned positions. For example, one fixing portion 611 is defined on an area around the rotatable members 113, another fixing portion 611 is defined on the connecting rod 300 or in the driving housing 400. Alternatively, one fixing portion 611 is defined in the connecting rod 300, the other fixing portions 611 are defined in the connecting assembly 200.

In one embodiment, the clamping portion 110 has a guiding member, the conductive wire 610 is arranged on the clamping portion 110 and extends along the guiding member, thus the conductive wire 610 being arranged adjacent to the clamping portion 110. As shown in FIG. 30, a guiding member 114 has a guiding hole 103 and an opening 104 communicated with the guiding hole 103, thus the conductive wire 610 is received in the guiding hole 103 via the opening 104. In other embodiments, the opening 104 can be avoided, in this situation, the conductive wire 610 extends through the guiding hole 103, thus received in the guiding hole 103. Alternatively, the guiding member 114 can directly be a guiding groove in the clamping portion 110, the conductive wire 610 is received in the guiding groove. In the present embodiment, the guiding groove is on a surface of the clamping portion 110, for example, on a side surface of the clamping portion 110, in more detail, the side surface is the surface adjacent to the opposite surfaces of the clamping portion 110 facing to each other. In other embodiments, the guiding member 114 may include a guiding groove formed in the clamping portion 110, and a guiding element, the conductive wire 610 is received in the guiding groove, and the guiding element helps guiding the conductive wire 610 in the guiding groove. For example, the guiding element can be a bar, and an extending axis of the bar is not parallel with an extending axis of the guiding groove.

In one embodiment, the conductive wire 610 extends through the connecting assembly, and the conductive wire 610 is positioned at a central axis of the connecting assembly. Alternatively, the conductive wire 610 is adjacent to the central axis of the connecting assembly. Two conductive wires 610 can extend through the connecting assembly via a hole, or extend through the connecting assembly via two holes.

In one embodiment, the surgical instrument 23 further includes a wire receiving rod extending through the connecting assembly. The wire receiving rod has a wire receiving hole, the conductive wire 610 is received in the wire receiving hole, and is spaced with an inner wall of the wire receiving hole. In particular, the wire receiving rod can be in similar structure with the flexible rod 510 described above, to protect and orient the conductive wire 610.

Referring to FIGS. 31 to 34, the tip driving unit 500 of the surgical instrument 23 has the driving wire 520, a driving assembly 530, and a positioning member 540. The driving wire 520 extends through the connecting assembly 200 to be connected with the end effector 100, and can be bent with the connecting assembly 200. The driving wire 520 has a driving connecting portion 521 connected to the driving assembly 530, at least part of the driving wire 520 extending out of the connecting assembly 200 is oriented by the positioning member 540, thereby the driving wire 520 is driven by the driving assembly 530 to move along a straight line, and in this way, the end effector 100 is driven. In particular, the rigidity of the at least part of the driving wire 520 is greater than that of the part of the driving wire 520 received in and bent with the connecting assembly 200, and the above-mentioned driving wire 520 driven along a straight line is referred to at least the driving connecting portion 521 of the driving wire 520 is driven to move along the straight line. The end effector 100 can have the clamps 111, and the driving wire 520 drives the clamps 111 to open or close. Alternatively, the driving wire 520 drives the end effector 100 to rotate, in this situation, the end effector 100 can be worm structures connected to be a distal end of the driving wire 520.

In a working state of the above configured end effector 100, when the driving wire 520 drives the end effector 100 to move forward, the positioning member 540 can help orienting the driving wire 520, thereby a moving error of the driving wire 520 can be reduced, and thus an operation of the end effector 100 can be more accurate.

In one embodiment, in an original state of the connecting assembly 200, a moving direction of the driving connecting portion 521 of the driving wire 520 is the same with an extending direction of the connecting assembly 200, i.e., in the original state, the connecting assembly 200 extends along a straight line, and the driving wire 520 is also in a straight line, to be the same with the moving direction of the driving connecting portion 521 of the driving wire 520. In other embodiments, in an original state of the connecting assembly 200, a moving direction of the driving connecting portion 521 of the driving wire 520 forms an angle with an extending direction of the connecting assembly 200, for example, the angle be an obtuse angle. In this situation, the part of the driving wire 520 within the connecting assembly 200 can be movably retained by inner structures of the connecting assembly 200, for example, can be movably retained by the receiving hole 211 of the connecting assembly 200. Preferably, in one embodiment, the driving wire 520 moves along a central axis of the connecting assembly 200, that is, the driving wire 520 is oriented at a central area of the connecting assembly 200, thereby further improving an accurate of the operation.

The above defined positioning member 540 can have various structures, for example, as shown in FIG. 31, the tip driving unit 500 has the flexible rod 510 extending through the connecting assembly 200, the driving wire 520 extends through the flexible rod 510, and the part of the flexible rod 510 which extends through the connecting assembly 200 forms the positioning member 540 to orient the driving wire 520, thereby obstructing bending of the driving wire 520. In embodiments illustrated in FIGS. 32 and 33, the positioning member 540 has a groove, and the driving wire 520 is received in and moves along the groove, thereby obstructing bending of this part of the driving wire 520. As shown in FIG. 34, the positioning member 540 surrounds the driving connecting portion 521 of the driving wire 520, in this way, obstructing bending of this part of the driving wire 520, and in this situation, the positioning member 540 can be positioned at the driving assembly 530, and can be moved along with the driving wire 520, and the driving connecting portion 521 can be directly positioned at the driving assembly 530, and alternatively positioned at the driving assembly 530 via the positioning member 540. In one embodiment, the positioning member 540 can be in a strip shape, for example, a length of the positioning member 540 can be in a range of 5-10 mm. In other embodiments, there are a plurality of the positioning members 540, and the positioning members 540 can be spaced with each other in a line.

It can be understood that, the positioning member 540 can also be a combination of the above-mentioned structures, for example, the positioning member 540 may include a part of the flexible rod 510 and a groove, and the flexible rod 510 is received in the groove, and the groove cooperates with the part of the flexible rod 510 to orient the driving wire 520.

In one embodiment, the positioning member 540 is arranged near the driving connecting portion 521 of the driving wire 520 for reducing a distance between the positioning member 540 and the driving connecting portion 521 of the driving wire 520. Referring to FIG. 31, a part of the flexible rod 510 is arranged near the driving connecting portion 521 of the driving wire 520, and the part of the flexible rod 510 does not obstruct the working of the driving assembly 530. For example, when the driving connecting portion 521 is at a farthest position, the connecting portion 521 is at a proximal end of the flexible rod 510, that is, when the driving assembly 530 drives the driving connecting portion 521 moves to the farthest position, the proximal end of the flexible rod 510 and a periphery of the driving connecting portion 521 are located at a same surface. Alternatively, when the driving connecting portion 521 moves to the farthest position, the proximal end of the flexible rod 510 is almost at a distal end of the driving connecting portion 521, and a distance can be maintained therebetween in a range of 3-10 mm. In embodiments illustrated in FIGS. 32 and 33, a surface of the groove surrounds the driving connecting portion 521 when the driving connecting portion 521 is in a movement state, and an opposite surface of the groove is at a farthest position where the driving connecting portion 521 moves to.

In one embodiment, the driving assembly 530 may be a transmission assembly including two wheels, and a conveyer belt transmitted by the two wheels. The driving connecting portion 521 of the driving wire 520 is connected to the conveyer belt, and is driven along a straight line by the conveyer belt. In detail, the two wheels roll at a same direction and at a same rate with the conveyer belt. In a further embodiment, the conveyer belt can be driven by the wheels by the friction therebetween. In other embodiments, the driving assembly 530 can be other structures, for example, the driving assembly 530 can be a gear, and the driving wire 520 can be oriented by the gear.

In one embodiment, the driving wire 520 is welded on the driving assembly 530, for example, the driving connecting portion 521 of the driving wire 520 is welded with the conveyer belt of the driving assembly 530. When the welded portions are in a strip shape, the welded portions can be understood as the positioning member 540 surrounding the driving connecting portion 521 of the driving wire 520. In another embodiment, the driving wire 520 can be connected to the driving assembly 530 by a connecting element, for example, the connecting element is welded with the driving wire 520, alternatively, the driving wire 520 is engaged with the connecting element, and the connecting element is located on the conveyer belt. In detail, the driving wire can have an engaging protrusion for engaging with the connecting element. In particular, the connecting element can have an engaging groove, and the engaging groove is engaged in the engaging protrusion. In this situation, it can also be understood that the connecting element is a part of the positioning member 540.

In one embodiment, a distal end of the driving wire 520 is the driving connecting portion 521, in this situation, at least part of the driving assembly 530 is located within the driving housing 400. In another embodiment, a proximal end of the driving wire 520 can also be the driving connecting portion 521, that is, at least part of the driving assembly 530 is arranged near the end effector 100. Alternatively, the driving connecting portion 521 can also be a middle portion of the driving wire 520.

It is noted that, the endoscope of the present disclosure may be applied to the operating arm of the surgical robot or other devices where the endoscope is desired.

The various technical features of the above-described embodiments may be combined in any combination, so that the description is concise, and all possible combinations of the various technical features in the above-described embodiments are described. However, as long as the combination of these technical features does not conflict, it is to be understood that the scope of the present specification is not to be taken in a limiting sense.

The above-described embodiments have only expressed several embodiments of the present application, which are described in more detail and detail, but are not therefore to be construed as limiting the scope of the present application. It should be noted that variations and modifications may be made to one of ordinary skill in the art without departing from the spirit of the present application, all of which fall within the scope of the present application. Therefore, the scope of the appended claims should be accorded the broadest interpretation so as to encompass all such modifications and similar arrangements.

What is claimed is:

1. A surgical instrument, comprising:
   an end effector;
   a connecting assembly comprising a plurality of connecting units connected in sequence and connected to the end effector; and
   a tip driving unit comprising a flexible rod and a driving wire, the driving wire extending through the flexible rod and being connected to the end effector, the flexible rod extending in the connecting assembly, at least one end of the flexible rod being a free end, and a direction of the free end being changeable in response to a force applied on the free end;
   wherein the tip driving unit further comprises a driving assembly and a positioning member, the driving wire comprises a driving connecting portion, the driving connecting portion is a part of the driving wire extending out of the connecting assembly, the driving assembly comprises a transmission assembly comprising two wheels and a conveyer belt rotated by the two wheels, the positioning member is positioned on the conveyer belt, the driving connecting portion of the driving wire is surrounded and orientated by the positioning member, the driving connection portion of the driving wire is connected to the conveyer belt through the positioning member, and is driven by the conveyer belt in a straight line.

2. The surgical instrument of claim 1, wherein a space is maintained between two adjacent of the plurality of connecting units, the space is configured for accommodating bending of the two adjacent connecting units, and the flexible rod covers at least a part of the space.

3. The surgical instrument of claim 1, wherein the flexible rod comprises a plurality of openings configured for allowing the flexible rod being bent.

4. The surgical instrument of claim 1, wherein the flexible rod comprises a plurality of flexible rods, and the plurality of flexible rods is arranged in sequence along an extending axis of the plurality of connecting units, the driving wire extends through the plurality of flexible rods and is connected to the end effector.

5. The surgical instrument of claim 1, wherein the end effector comprises two clamping portions, each of the two clamping portions comprises a clamp, an insulating member, and a rotatable member, the clamp forms an electrode, and is insulated from the rotatable member by the insulating member, the rotatable members are rotatably connected to drive the clamps to open or close.

6. The surgical instrument of claim 1, wherein the end effector comprises a clamp, the surgical instrument further comprises:
   a main body, the connecting assembly disposed on the main body and configured for adjusting a position and/or a pose of the end effector;
   an electrocoagulation assembly comprising a conductive wire, a distal end of the conductive wire being electrically connected to the clamp, thereby forming an electrode in the clamp, a part of the conductive wire received in the connecting assembly being loose, the conductive wire having a fixing portion fixed on the main body and/or the end effector, thereby allowing the distal end of the conductive wire to be close to the end effector.

7. The surgical instrument of claim 1, wherein the positioning member defines a groove, the driving wire is movably received in and surrounded by the groove, and a surface of the groove extends to a farthest position where the driving connecting portion moves to when driven by the conveyer belt in a straight line.

8. The surgical instrument of claim 1, wherein the driving connecting portion is welded with the conveyer belt through welded portions, and the positioning member comprises the welded portions.

9. The surgical instrument of claim 1, wherein each of the plurality of connecting units defines a receiving hole, each of the flexible rod is received in a corresponding one of the receiving hole, an inner wall of the receiving hole and/or the flexible rod has an abutting portion, and the flexible rod is abutted in the receiving hole.

10. The surgical instrument of claim 9, wherein the receiving hole is cone-shapes, a smaller end of the cone-shaped receiving hole forms the abutting portion; or, the inner wall of the receiving hole has a protrusion protruding from a periphery of the connecting unit, the abutting portion is defined on the protrusion.

11. The surgical instrument of claim 1, wherein each of the plurality of connecting units defines a receiving hole, the flexible rod extends through the receiving hole, at least one of the plurality of connecting units has a retaining portion covering at least part of the receiving hole, thereby obstructing a movement of the free end.

12. The surgical instrument of claim 11, wherein the flexible rod comprises two free ends, two connecting units of the connecting assembly each has the retaining portion, and the retaining portions of the two connecting units are arranged adjacent to the corresponding free ends of the flexible rod.

13. The surgical instrument of claim 11, wherein the retaining portion is continuous, and defines a passage configured for the driving wire to pass through, or, the retaining portion is porous, and has a plurality of holes for the driving wire passing through one of the plurality of holes.

14. The surgical instrument of claim 1, wherein the plurality of connecting units defines a first receiving hole and a second receiving hole, the flexible rod extends through each of the first receiving hole and the second receiving hole, a diameter of the second receiving hole is less than that of the first receiving hole, thus a space between the flexible rod and an inner wall of the first receiving hole is greater than a space between the flexible rod and an inner wall of the second receiving hole, thereby orienting a movement of the flexible rod.

15. The surgical instrument of claim 1, wherein the flexible rod defines one or more wire holes near a central axis of the flexible rod or near a periphery of the flexible rod, the driving wire extends through the wire holes.

16. The surgical instrument of claim 1, wherein a rigidity of the driving wire is greater than that of the flexible rod, and friction coefficient between the driving wire and the flexible rod is less than that between the driving wire and the plurality of connecting units.

17. A surgical instrument, comprising:
an end effector;
a connecting assembly comprising a plurality of connecting units connected in sequence and connected to the end effector;
a tip driving unit comprising a flexible rod and a driving wire, the driving wire extending through the flexible rod and connected to the end effector, the flexible rod extending in the connecting assembly, at least one end of the flexible rod being a free end, and a direction of the free end being changeable in response to a force applied on the free end;
wherein a space is maintained between two adjacent of the plurality of connecting units to allow bending of the two adjacent connecting units, the flexible rod covers at least a part of the space, and
the flexible rod comprises a plurality of openings for facilitating bending of the flexible rod;
wherein the tip driving unit further comprises a driving assembly and a positioning member, the driving wire comprises a driving connecting portion, the driving connecting portion is a part of the driving wire extending out of the connecting assembly, the driving assembly comprises a transmission assembly comprising two wheels and a conveyer belt rotated by the two wheels, the positioning member is positioned on the conveyer belt, the driving connecting portion of the driving wire is surrounded and orientated by the positioning member, the driving connection portion of the driving wire is connected to the conveyer belt through the positioning member, and is driven by the conveyer belt in a straight line.

18. A surgical instrument, comprising:
an end effector;
a connecting assembly comprising a plurality of connecting units connected in sequence and connected to the end effector; and
a tip driving unit comprising a flexible rod and a driving wire, the driving wire extending through the flexible rod and being connected to the end effector, the flexible rod extending in the connecting assembly, at least one end of the flexible rod being a free end, and a direction of the free end being changeable in response to a force applied on the free end;
wherein the plurality of connecting units have at least two receiving holes, the flexible rod extends through the at least two receiving holes, a space between the flexible rod and an inner wall of any one of the at least two receiving holes is different from a space between the flexible rod and an inner wall of another of the at least two receiving holes;
wherein the tip driving unit further comprises a driving assembly and a positioning member, the driving wire comprises a driving connecting portion, the driving connecting portion is a part of the driving wire extending out of the connecting assembly, the driving assembly comprises a transmission assembly comprising two wheels and a conveyer belt rotated by the two wheels, the positioning member is positioned on the conveyer belt, the driving connecting portion of the driving wire is surrounded and orientated by the positioning member, the driving connection portion of the driving wire is connected to the conveyer belt through the positioning member, and is driven by the conveyer belt in a straight line.

\* \* \* \* \*